Oct. 28, 1958 H. A. DAVIS 2,858,496
TIMING MECHANISM
Filed Aug. 30, 1954 2 Sheets-Sheet 1

INVENTOR.
Howard A. Davis
BY
Knight & Rodgers
ATTORNEYS

Oct. 28, 1958      H. A. DAVIS      2,858,496

TIMING MECHANISM

Filed Aug. 30, 1954      2 Sheets-Sheet 2

INVENTOR.
Howard A. Davis
BY
Knight & Rodgers
ATTORNEYS

United States Patent Office 2,858,496
Patented Oct. 28, 1958

2,858,496

TIMING MECHANISM

Howard A. Davis, Arcadia, Calif., assignor to George E. Moody, Glendale, Calif.

Application August 30, 1954, Serial No. 453,037

7 Claims. (Cl. 318—443)

The present invention relates generally to timing devices, and more especially to a timing mechanism adapted to time operation of a control mechanism which in turn operates in sequence a plurality of devices. The present timing mechanism has been especially designed and adapted to be used in conjunction with a control mechanism for operating a plurality of valves in a lawn sprinkler system and it therefore will be illustrated and described in this embodiment; but it will be understood that in its broader aspects my invention is not necessarily so limited.

Where large lawns or planted areas are to be watered from a single main conduit, it is the usual practice to provide a plurality of distribution valves which each control a different group of sprinkler heads. Ordinarily, each group is adapted to be operated by itself and the flow of water to the entire group is controlled by a single valve. Of course, it is possible to control the operation of each valve manually which necessitates manually turning on the valve and after the water has been flowing for the required time, turning it off and then turning on a valve of another group. This operation is repeated until all the groups of sprinklers have been in operation to water the entire area.

It is typical that each group of sprinklers may require a different length of time of operation. Sunny areas of course dry out faster and therefore require more water, and hence a longer time of operation, than do shaded areas where the daily watering period may be comparatively short. Manual operation of a number of valves is relatively expensive. It takes a large part of one man's time to make the round of all the valves and the remainder of this time cannot be efficiently used on other tasks. On the other hand, if operating a sprinkler system is subordinated to other tasks, it is very likely that the several groups of sprinklers will not be operated for the proper length of time, there being either too much or too little water applied through them.

One type of control unit for controlling the operation of the plurality of distribution valves is illustrated in Patent No. 2,478,702, issued August 9, 1949, to George E. Moody. This control mechanism is adapted to turn on and off in timed sequence a plurality of remotely located individual valves each controlling the flow of water to a group of sprinklers. However, this control unit is so designed that it opens each one of the valves for the same length of time which is constant, so that the interval of operation of each valve cannot change independently of the time of operation of the other valves. The present invention is in the nature of an addition to or improvement upon the driving mechanism of the control unit disclosed in said Moody patent which enables variation of the length of time which each valve is open independently of the other valves. This results in greater flexibility of operation.

Thus it becomes a general object of my invention to provide an automatic timing mechanism which is adapted to control the opening and closing of the plurality of valves or other remote devices in timed sequence for easily variable periods of time.

It is also an object of my invention to provide an automatic timing mechanism of the character described in which the length of time of operation of each of the valves, or other controlled devices, can be preset independently of the length of time of operation of the other valves.

It is an object of my invention to provide an automatic timing mechanism of the character described which contains means for quickly and easily varying the operating period of all valves as may be required with the changing seasons of the year or other conditions in order to lengthen or shorten the complete cycle of operations.

A further object of my invention is to provide a timing mechanism of this character which is simple in construction, inexpensive to manufacture, and easy to operate.

These objects and advantages of my invention are achieved by a novel type of variable timing mechanism which includes an electric circuit means for controlling the operation of motor means, typically an electric motor, which drives the control mechanism through suitable driving mechanism. The control mechanism in turn remotely controls the operation of a plurality of devices, in this instance the individual distribution valves which control the flow of water to the sprinklers. The electric circuit means is one which stops the motor and thus causes the control mechanism to remain stationary for an interval of time and then automatically restarts the motor. Incorporated in the timing mechanism is a clock mechanism which establishes the length of the interval of time for which the motor is stopped and the control mechanism remains stationary. This clock means is preferably a reset timing mechanism of conventional design which may be easily adjusted to vary the established length of this time interval and which, after the end of each time interval, automatically resets itself so that it is in position to start the measurement of another time interval of equal length.

In order to regulate the total period of time for which each one of the valves is held open, which is a function of the number of said time intervals that the control mechanism remains stationary while operating that particular valve, there is provided in the timing mechanism a novel switch actuating means which is driven in timed relation to the control mechanism. The switch actuating means preferably includes a rotating member which operates a switch means incorporated in the electric circuit and adapted to stop the motor by actuation of the switch. The rotating member is provided with a plurality of pins or similar members which may be selectively positioned to engage the switch means. By changing the number of pins which are operative, the number of intervals of time, established by the clock mechanism, may be changed for which the control mechanism remains stationary within a given travel or movement of the control mechanism.

How the above objects and advantages of my invention, as well as others not specifically referred to herein, are attained will be better understood by reference to the following description and to the annexed drawings, in which.

Figure 1:
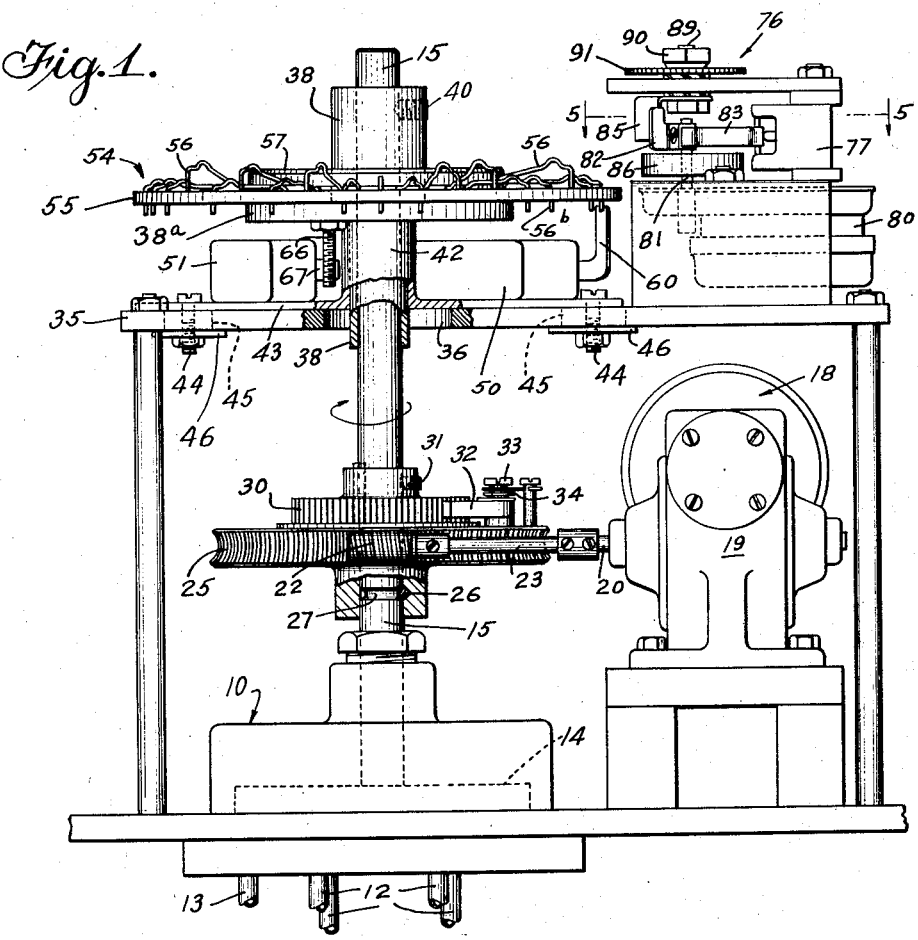
Fig. 1 is a side elevation of a preferred embodiment of my invention, including the control mechanism and the motor means, parts of the mechanism being broken away in section for purposes of better illustration.

Referring now to the drawings, and more particularly to Fig. 1, there is indicated generally at 10 a control mechanism which is adapted to remotely control the operation of a plurality of devices such as hydraulic valves. The remote control mechanism herein illustrated is the same as that disclosed in the aforesaid Moody patent and for that reason is not described in detail. However, it will be understood that this control mechanism is only typical and the invention is not limited to this or any other particular type of control mechanism.

Control mechanism 10 is adapted to control remotely a plurality of distribution valves in branch conduits each supplying water to a plurality of sprinkler heads, control being effected through the medium of hydraulic means. For this purpose the control mechanism is provided with a plurality of conduits 12 which are connected to the valves to be operated (not shown) and a conduit 13 which is connected to a source (not shown) of hydraulic fluid under pressure. Within an outer housing, control mechanism 10 has a rotary valve disc 14 which is connected to one end of drive shaft 15 to be rotated by the shaft. As valve disc 14 rotates, it establishes communication in succession with each one of the several conduits 12, as is described in detail in the aforesaid Moody patent, causing the connected distribution valve to open. It is a characteristic of this particular control mechanism that communication is maintained with each conduit 12 during a given travel of disc 14, and also of drive shaft 15, the travel in this case being a known arcuate movement of the disc and shaft. Consequently, the period of time during which the remotely controlled device is actuated is determined by the length of time that it takes disc 14 to traverse this given angle which is determined by the design of control mechanism 10 and is equal for each one of conduits 12.

Shaft 15 is driven by any suitable type of motor means, herein indicated as being electric motor 18 of the gear head type provided with speed reducing mechanism 19 having an output shaft 20 which turns at a considerably lower speed than the rotor of the motor 18. Motor means 18 is connected to drive shaft 15 by any suitable type of driving mechanism, here shown as including a worm gear in order to obtain additional speed reduction. Drive mechanism includes worm 22 on shaft 23 which is suitably coupled to output shaft 20. Worm 22 meshes with the teeth on worm wheel 25, the worm wheel being mounted on drive shaft 15 to rotate independently of the shaft. Longitudinal movement of worm wheel along shaft 15 is prevented by pin 26 passing horizontally through the hub of the worm wheel and riding in annular groove 27 in the drive shaft.

In order to rotate the shaft 15, a pawl and ratchet mechanism is employed to transmit power from worm wheel 25 to the drive shaft. This includes a circular ratchet 30, the hub of which is non-rotatively affixed to shaft 15 by set screw 31 or other similar means. Pawl 32 is pivotally mounted by screw 33 on the upper face of worm wheel 25, the pawl being kept normally in engagement with the teeth of ratchet 30 by means of spring 34.

This arrangement of parts is based on a design which assumes operational movement of shaft 15 and valve disc 14 in a clockwise direction when viewed from above. As worm wheel 25 is rotated clockwise, pawl 32 drives the circular ratchet and the drive shaft. The drive shaft may be rotated manually to advance it in the same direction any desired amount, independently of motor 18. This permits manual operation of the control mechanism independent of the automatic drive and timing means.

The motor means and the gear train for drivingly connecting the motor to shaft 15 are essentially the same as disclosed in the aforesaid Moody patent; but it will be understood that the invention is not necessarily limited to the exact arrangement herein disclosed.

Mounted above motor 18 and the worm gear, is platform 35 which supports various elements of the timing mechanism. Drive shaft 15 is extended upwardly above the worm gear and through an opening 36 in the platform, the size of the opening in the platform being such as to provide substantial clearance at all sides of the shaft.

This clearance around the drive shaft, as well as certain other construction features described later, are adopted in order to permit the timing mechanism above platform 35 to be added to a previously installed motor driven control unit 10 by simply positioning the platform above the motor and control unit. Since under these conditions it is impractical to locate platform 35 in a given position relative to the drive shaft, provision is made for shifting certain parts relative to the platform in order to obtain proper alignment of them with shaft 15 and the clearance afforded by opening 36 should be large enough to take care of the anticipated range of movement in order to obtain such alignment of the parts.

On the upper portion of drive shaft 15 there is located sleeve 38 which is non-rotatably attached to the shaft by set screw 40 or other means for attaching the sleeve to the shaft. The lower portion of sleeve 38 provides a bearing and is received within collar 42 which is preferably formed integrally with plate 43 mounted on top of platform 35. Plate 43 is fastened to platform 35 by a plurality of bolts 44 which pass through openings 45 in the platform that are considerably larger than the bolts. A washer 46 is placed on each bolt underneath the opening, the washer being larger than the associated opening 45 in order to permit a nut to be tightened up on the bolt and clamp plate 43 in an adjusted position with respect to the platform. This construction permits plate 43 to be moved a limited amount in any direction until the collar 42 is coaxial with shaft 15 as determined by the bearings provided for the shaft in control mechanism 10. Once in proper position, this position is maintained by tightening on bolts 44.

On plate 43 are mounted two switches, 50 and 51. These two switches are fastened to plate 43, either directly or by means of a suitable bracket, so that their position is always fixed and definite with reference to the axis of collar 42 and shaft 15. Consequently these switches can be factory-assembled on the plate in positions to be engaged by switch actuating means mounted upon shaft 15 to be rotated thereby.

Means for actuating these switches is generally indicated at 54. The switch actuating means includes disc 55 which, as shown particularly in Figs. 2 and 3, carries a plurality of switch actuating pins 56. Disc 55 is clamped between upper plate 57 and flange 38a of sleeve 38 by screws 59.

Figure 3:
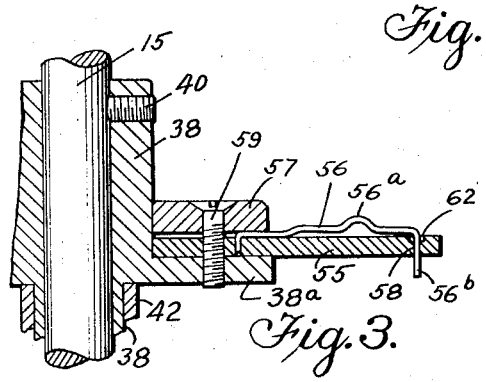
Fig. 3 is a fragmentary vertical median section through the switch actuating member showing a switch engaging pin in lowered position to engage the switch.

Disc 55 is provided with a plurality of pairs of holes which are drilled parallel to the axis of the plate. The holes of each pair are on a radial line and are radially spaced apart. Each of these pairs of holes is a means for mounting on the disc a pin 56. Each pin 56 has a wide U-shape with two legs of unequal length. The shorter leg is inserted in the inner hole of each pair, while the longer leg 56b is inserted in the outer hole 58 of each pair of holes. The inner hole of each pair is underneath plate 57 so that the inner end of each pin is firmly clamped between the upper surface of disc 55 and the under surface of plate 57, as shown in Fig. 3. This holds all the pins firmly in place.

The outer and longer leg 56b of each pin 56 is long enough to pass entirely through disc 55 and project below the disc for the distance desired in order to engage and operate the arm 60 of switch 50. When in switch engaging position, the pins appear as shown in Fig. 3. The outer hole 58 of each pair of pin receiving holes in the disc is located so that the outer arm of each pin traverses a path which brings the pins successively into engagement with switch arm 60.

Figure 4:
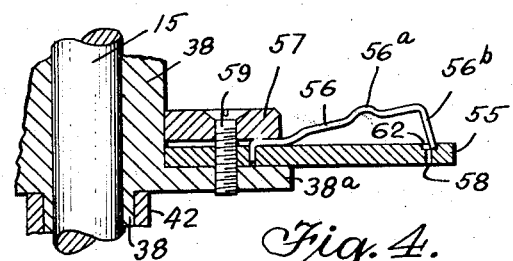
Fig. 4 is a view similar to Fig. 3 in which the switch engaging pin is raised to an inoperative position in which it does not engage the switch.

As is shown in Figs. 3 and 4, the upper end of each of the outer pin receiving holes 58 is counterbored as at 62, or is otherwise provided with shoulder means to hold the pin in the inoperative position, shown in Fig. 4. Each of the pins is made of spring steel so that when the free outer end of the pin is withdrawn upwardly to a position near the top surface of disc 55, the free end springs outwardly and rests on the shoulder provided by counterbore 62. This holds the pin securely in an inoperative position from which it can easily be returned to the outer pin-receiving hole and yet is retracted to a position where it cannot engage switch arm 60. Each of the pins is preferably provided with a small hump 56a intermediate the ends of the pin so that a suitable tool may be inserted beneath the pin to spring it to the raised position of Fig. 4. The pin may be easily returned to the switch engaging position of Fig. 3 by pressing radially inward on the free end of the pin to move leg 56b of the pin into the hole in the disc. The pin being resilient, the spring action of the pin itself causes it to pass through the disc and resume the position of Fig. 3. This construction has the advantage that the switch-engaging portions of pins 56 can easily be moved between operating and non-operating positions while each pin as a whole is anchored in place by plate 57 so that the pin cannot become lost, as is the danger when using pins which are detachable or completely separable from disc 55.

Pins 56 are uniformly angularly spaced around disc 55. The total number of pins employed may be varied as required, the number here shown being only by way of example. For reasons that will be explained in greater detail later, the pins are divided into seven groups of five pins each. Each group of pins occupies an angular distance indicated at 64. Between the first and last group of pins there is left a short blank space in the disc as at 65.

Disc 55 also carries a single fixed pin 66 located so as to engage arm 67 of switch 51. This engagement takes place only once for each revolution of disc 55.

Figure 6:
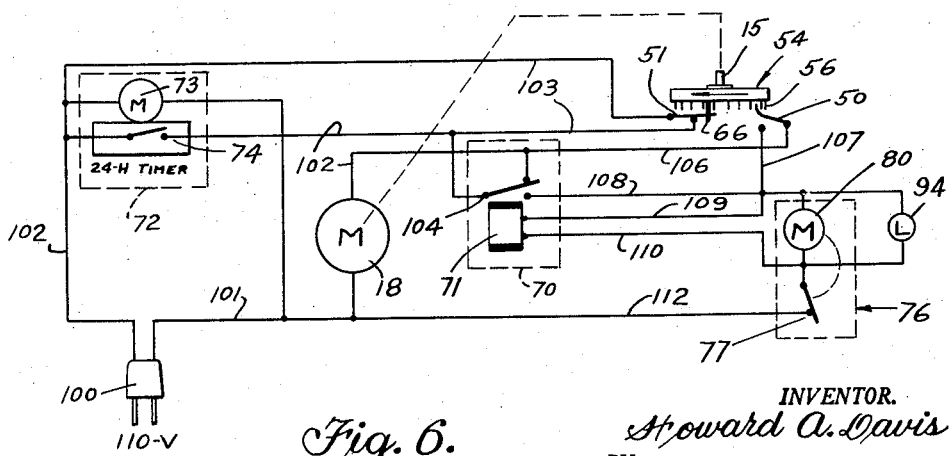
Fig. 6 is a wiring diagram of the electrical circuit controlling operation of the primary drive motor.

In order to effect proper operation and control of the motor means, there is provided electric circuit means, as shown diagrammatically in Fig. 6, for intermittently stopping and starting motor 18 during the cycle of operation. As will be explained more fully later, the motor means is intermittently stopped for a pre-established interval of time during which the rotation of valve disc 14 is stopped and the control mechanism remains in a given position for the established interval of time. After each interval of time elapses, the circuit means restarts the motor and that particular operation is repeated a number of times determined by the number of pins 56 which are placed in operative position. The elements of the circuit means are mounted on or above platform 35.

Electric circuit includes a single-pole, double-throw relay 70 which has a common contact normally connected to a normally closed contact and connected to a normally open contact when the relay coil 71 is energized. The type of relay illustrated here is of the so called "telephone type" which is fully enclosed and is provided with prongs for mounting in a socket base.

Also included in the circuit means is 24-hour timer 72 which may be of any suitable design. In general, the timer includes an electrically driven synchronous motor 73 which is adapted to close the normally open contacts of switch 74 at a predetermined time during each 24-hour day. Switch 74 is maintained closed for only a short length of time, after which the contacts return to the normally open position. The timer herein illustrated is also of unitary construction and is provided with prongs by which it may be mounted in a socket type base, but it may be located at other positions, if desired, using the base to receive a plug on a cord.

Also mounted on platform 35 is reset timer 76 which likewise is of conventional design and construction and is associated with the circuit in order to provide electric clock means in the circuit which establishes the length of the interval of time referred to above during which motor 18 is stopped. The clock mechanism of the reset timer operates to open a normally closed switch 77 which is incorporated in the electric circuit, as will be described.

Figure 2:
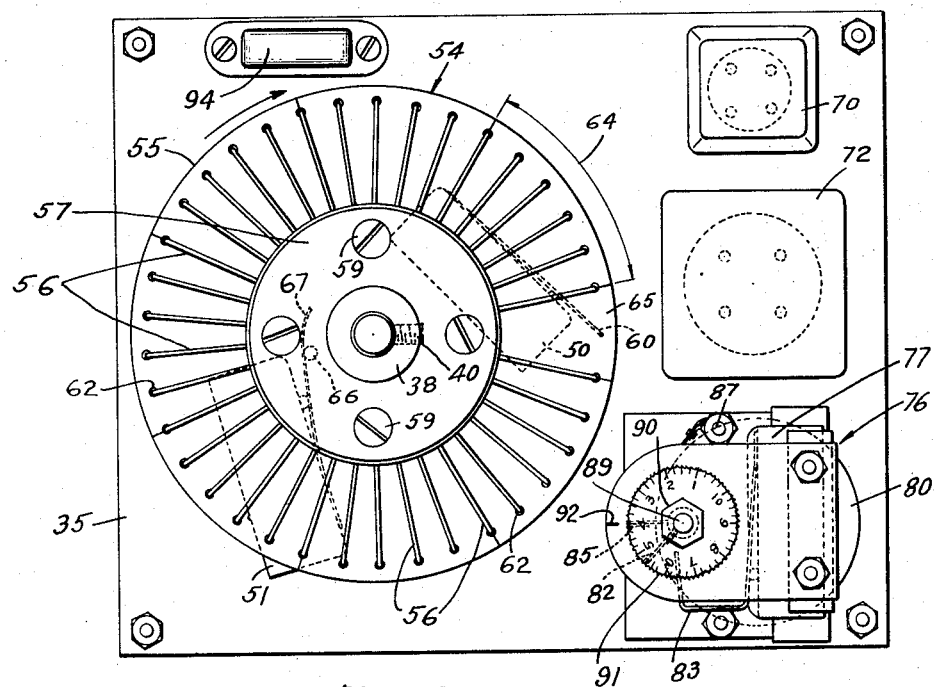
Fig. 2 is a plan view of the mechanism in Fig. 1.
Figure 5:
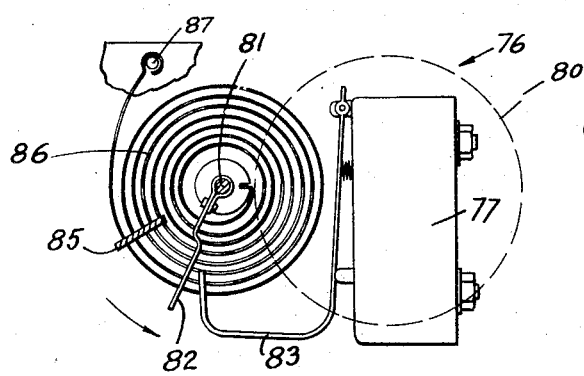
Fig. 5 is a diagrammatic plan view of the automatic reset mechanism of the clock means as on line 5—5 of Fig. 1.

The clock and reset mechanism of the reset timer are shown in Figs. 2 and 5, Fig. 5 showing the essential parts diagrammatically and disclosing their relation to each other. The timer 76 includes an electric clock motor 80 which, through a suitable reducing gear train within the motor housing, drives shaft 81 in a counterclockwise direction, viewed from above. Attached to shaft 81 is arm 82 which is movable into engagement with switch arm 83 of switch 77 to actuate the switch in a manner to open the normally closed contacts of the switch at the end of the operating stroke of arm 82. Motor 80 is then deenergized and arm 82 is free to be returned in a clockwise direction by coil spring 86 to its initial starting position.

This initial position is determined by an adjustable stop 85 which is fixed in position and limits the return travel of arm 82 under the influence of coil spring 86. The inner end of coil spring 86 is suitably attached to shaft 81 while the outer end of the spring is connected at 87 to the frame of the timer.

Adjustable stop 85 is attached to shaft 89 which is coaxial with and immediately above driven shaft 81. Shaft 89 is pivotally mounted in the timer frame and has lock nut 90 threaded on to the upper end and also carries disc 91. Disc 91 is conveniently graduated in minutes so that the position of the disc and consequently of attached stop arm 85 can be readily determined by reference to the graduations and index 92. The timer herein illustrated is graduated from zero to ten minutes which is the maximum period which it takes arm 82 to travel from its initial position into engagement with switch arm 83. A timer having longer or shorter range of travel or time intervals may be used if desired.

Althought entirely optional, I prefer to include neon glow lamp 94 to provide an easy visual indication that motor 80 of reset timer is energized and operating.

The manner in which these circuit components are electrically connected is shown diagrammatically in Fig. 6. The circuit may be connected to any convenient source of power, usually the familiar 110 volt domestic power supply lines, by plug 100. From this plug conductor 101 goes to one terminal of valve motor 18. From the plug the other conductor 102 connects to the other terminal of valve motor 18 in series with switch 74 and the normally closed set of contacts in relay 70. Connection is made from switch 74 to the common contact 104 of relay 70 so that when the relay coil is deenergized, the power supply circuit energizing motor 18 is completed through the normally closed contacts. In the 24-hour timer clock, motor 73 is connected directly to conductors 101 and 102 so that the motor is energized regardless of whether switch 74 is open or closed.

Conductor 103 connects switch 51 in parallel with switch 74 of the 24-hour timer.

Conductor 106 connects the normally closed contact of relay 70 with one terminal of switch 50, the other terminal of switch 50 being connected by conductor 107 to one terminal of motor 80 of the reset timer. The same terminal of the motor is connected by conductor 108 to the normally open contact of relay 70 and by conductor 109 to one side of the relay coil 71. The other side of the relay coil is connected by conductor 110 to the second terminal of motor 80 so that motor 80 and the relay coil are in parallel with each other. The second terminal of motor 80 is connected in series through switch 77 by conductor 112 to conductor 101 and the first mentioned terminal of valve motor 18. Thus normally closed switch 77 at the reset timer is in series with both relay coil 71 and motor 80.

Indicating lamp 94 is connected in shunt across motor 80 in order that the lamp is on while the motor is energized and operating.

Having described the construction of my variable timing mechanism, I shall now describe briefly its operation. The first step is to establish the length of the interval of time for which the circuit stops motor 18. This interval of time, once established remains constant throughout the cycle of operation and until a new interval of time has been established within the mechanism. This interval becomes the basic time unit upon which all other calculations are based and which determines the length of time that each of the remotely controlled devices is operated as well as the length of the entire cycle of operation.

This interval of time is established by loosening nut 90 on the reset timer to face shaft 89 so that the position of adjustable stop 85 may be set by turning dial 91. Assuming that the basic interval of time is to be four minutes, then dial 91 is rotated to the position shown in which the graduation on the dial representing four minutes is opposite index 92. This position of stop 85 determines the initial position of operating arm 82 so that when motor 80 is energized it requires four minutes for the operating arm to travel from its initial position into engagement with switch arm 83.

The second preliminary adjustment is to determine the number of these basic time intervals, for which the control mechanism will be stopped for each remotely controlled device. This number of basic time intervals is set on disc 55 by pins 56 to determine the total time that any one of the remotely controlled devices is in operation. The sector on disc 55 which is allocated to control of the first distribution valve or other similar remotely controlled device, is the sector indicated at 64. The arcuate length of this sector represents the average distance traveled by disc 55 as a result of its rotation by drive shaft 15 to effect control of any given device. It is greater, as will be seen, than the travel during the period of active control.

In this particular design, although the first and last pins of this sector may be utilized to actuate switch 50, they are located in positions in which said control mechanism 10 cuts off communication with any one of the conduits 12. In other words these pins are in positions which correspond to the transition period between active control periods. Accordingly, these pins may be omitted if desired but are preferably included. As a consequence there are between these first and last pins of sector 64, four pins 56 which are actually effective to determine the length of the active control period for any given device. If it is desired that the distributing valve first actuated be turned on for a period of four minutes, any one of these four intermediate pins is lowered to the switch engaging position of Fig. 3, while the other three pins are raised to the non-engaging position of Fig. 4. By lowering none or any number of pins up to four in this group, there is preset on disc 55 a selected number of basic time intervals during which this first distribution valve is left open. In other words, it can be maintained open for zero, one, two, three or four basic time units; and since the basic time unit was assumed to be four minutes, the valve may be operated for a total of zero, four, eight, twelve or sixteen minutes respectively as may be desired by setting the corresponding number of pins 56 to a position in which they successively engage switch arm 60.

Having preset on disc 55 the operating conditions for the first distributing valve, the same is then done in the second and succeeding groups of pins 56 which are in the second and succeeding control sectors on the disc corresponding to succeeding distributing valves. It will be fully appreciated that since each pin 56 may be raised or lowered independently of any other pin, that the total number of time units preset on the disc for each of the remotely controlled distributing valves may be set entirely independently of the number for any other distributing valve. Hence the functions produced by any one pin and its operating relation to the other pins remain unchanged by movement of any other pin from operative to inoperative position.

With these adjustments made in the timing mechanism, it is now ready for normal operation through a complete cycle. This occurs automatically at a given time during each 24-hour day according to the setting of 24-hour timer 72. At the time set, normally open switch 74 of the 24-hour timer is closed, thus energizing the main drive motor 18 circuit comprising conductor 102, switch 74, the normally closed contacts of relay 70, motor 18, and conductor 101.

Motor 73 of timer 72 is always on the line and energized.

When valve motor 18 is energized, it rotates drive shaft 15 clockwise viewed from above, placing control mechanism 10 in operation. At the same time, shaft 15 rotates switch actuating means 54, bringing the lowered pins 56 successively into engagement with switch arm 60. As one of these pins engages the switch arm, normally open switch 50 is closed, completing a circuit from conductor 102 through conductors 106, 107 and 109 to relay coil 71. The remainder of this circuit is through conductors 110 and 112 and switch 77. Energization of the relay coil causes the common contact 104 to be connected to the normally open contact of the relay, completing a circuit from conductor 102 by way of conductor 108 to motor 80 of the reset timer, this circuit then continuing through normally closed switch 77 and conductor 112.

Reset timer motor 80 being now energized, the clock mechanism is placed in operation to drive operating arm 82 from its initial position to engagement with switch arm 83. This engagement with the switch arm 83 causes normally closed switch 77 to open, which breaks circuit through the relay coil and motor 80 and de-energizes both coil 71 and motor 80. As a consequence, the contacts of the relay return to the normally closed position. Likewise, coil spring 80 returns arm 82 to its initial position, disengaging switch arm 83 which allows switch 77 to return to its normally closed position.

Previously, motor 18 had continued to rotate switch actuating means 54 until pin 56 disengaged switch arm 60 to complete actuation of the switch. At that time switch 50 returned to a normally open position and motor 18 was stopped. With the return of the contacts in relay 70 to the normally closed position, motor 18 is again energized and continues to rotate switch actuating means 54 until a second pin 56 engages switch arm 60, whereupon the cycle of events just described is repeated.

This repetition of the same cycle occurs for each one of the pins 56 which are lowered to switch engaging position. Since the circuit means is adapted to repeatedly stop the operation of motor 18 for the pre-established interval of time and then automatically to start the motor again until the timing mechanism is in the proper position to stop the motor once more, this complete cycle continues automatically without interruption, however, a single pin 66 is placed on disc 55 in a position to engage arm 67 of switch 51. Switch 51 is normally closed, providing a parallel circuit energizing motor 18. However, when pin 66 engages arm 67 it moves switch 51 to an open position, breaking this circuit and de-energizing motor 18. Disc 55 stops, holding switch 51 open. This causes the entire cycle of operation to stop until switch 74 is again moved to the closed position by the 24-hour timer. The initial movement of disc 55 shortly disengages pin 56 from arm 67 allowing the switch to return to its normally closed position for nearly all of the revolution of disc 55. Switch 51 closes before the timer automatically reopens switch 74 so that normally motor 18 is running because of power supplied through conductor 103 and switch 51.

I claim:

1. In a timing mechanism for use with an electric motor to start and stop the motor, the combination comprising: relay means having an operating coil and a set of normally closed contacts connected in series with the motor to complete a power supply circuit to energize the motor, said coil when energized opening said contacts; a first switch in series with the coil of the relay means; means driven by the motor for intermittently actuating said switch to energize the coil of the relay means and interrupt the supply circuit to the motor; a second switch connected in series with the first mentioned switch and the coil of the relay means; and electric clock means connected in parallel with the coil of the relay to actuate the second mentioned switch after an established interval of time to deenergize the relay coil and restore the normally closed position of the contacts of the relay means.

2. In a timing mechanism the combination as in claim 1, in which the clock means includes reset mechanism operative when the clock means is deenergized to restore the second mentioned switch to its normal position and to reset the clock means in a position to operate for another established interval of time.

3. In a timing mechanism as in claim 2, the combination that also comprises means included in the clock means to vary the length of the established interval of time.

4. In a timing mechanism the combination as in claim 1, in which the means for actuating the first switch includes a rotatably mounted member and a plurality of angularly spaced switch engaging elements carried by the rotating member, said switch engaging element being individually movable between operative and inoperative positions.

5. In a timing mechanism the combination as in claim 1, that also includes a third switch connected in series with the motor and the normally closed contacts of the relay means, said third switch also being actuated by said switch actuating means to open the power circuit to the motor.

6. In a variable timing mechanism for actuating a control mechanism adapted to control the operation of a device, the combination comprising: a drive member operatively connected to the control mechanism; motor means drivingly connected to said drive member; electrical relay means including an operating coil, a first set of normally closed contacts completing a power supply circuit to energize the motor, and a second set of normally open contacts in parallel with said first set of contacts and connected in series with the coil of the relay means to energize the coil when closed and thereby open the normally closed contacts; switch means for energizing the relay coil; switch actuating means driven by the drive member to actuate said switch means periodically in response to movement of the drive member; and time controlled means de-energizing the relay coil a predetermined length of time after energization.

7. In a variable timing mechanism for use with an electric motor driving a control mechanism, the combination comprising: motor means drivingly connected to the control mechanism to operate the control mechanism; electric circuit means supplying power to the motor; a first switch in the circuit adapted to interrupt the circuit and stop the motor; and switch control means operating said switch including a member driven in timed relation to the control means to periodically cause the control means to open the first switch and interrupt the power supply to the motor, a normally closed second switch adapted when open to restore the first switch to a closed position, and an electrically driven timing means opening the second switch after a predetermined interval of time to close the first switch and restart the motor.

References Cited in the file of this patent

UNITED STATES PATENTS

| | | |
|---|---|---|
| 710,927 | Strait | Oct. 7, 1902 |
| 1,820,252 | Shippy | Aug. 25, 1931 |
| 2,163,419 | Warren | June 20, 1939 |
| 2,421,835 | Durant | June 10, 1947 |
| 2,460,486 | Blampain | Feb. 1, 1949 |
| 2,559,910 | White | July 10, 1951 |
| 2,577,155 | Rex | Dec. 4, 1951 |
| 2,637,835 | Davidson | May 5, 1953 |